Patented Aug. 16, 1932

1,871,731

UNITED STATES PATENT OFFICE

JAMES S. OFFUTT, OF CHICAGO, ILLINOIS, ASSIGNOR TO UNITED STATES GYPSUM COMPANY, OF CHICAGO, ILLINOIS, A CORPORATION OF ILLINOIS

PLASTER-BOARD MANUFACTURE

No Drawing. Application filed June 20, 1930. Serial No. 462,691.

This invention relates to plasterboard manufacture, and has reference more particularly to bonding agents for use in causing the paper cover sheets of a plasterboard to adhere firmly to the core body.

In the manufacture of plasterboard, it is common practice to form a core material for the plasterboard composed largely of gypsum, and to employ paper cover sheets for each surface of the core material to add strength to the core and also to make a smooth surface suitable for plastering or decorating. As the paper cover sheets do not cling tenaciously to the gypsum core material, it is necessary to use some adhesive to give a sufficient bond between the core and the cover sheets. Various materials have been proposed for this purpose but as a rule their action is rather uncertain and is apt to result in "peelers", that is, rejected or second quality boards where the paper cover sheets may be easily peeled from the core body.

An object of this invention therefore is to provide a method and bonding material in which the paper cover sheets are caused to cling tenaciously to the core body so as to produce a high percentage of first quality boards at all times; also to improve plasterboard manufacture and bonding agents in other respects hereinafter specified and claimed.

I find that the material commonly known as "rubber latex" is admirably suited for the purpose of supplying the necessary bond between the paper cover sheets and core body of a plasterboard. Rubber latex is a white liquid which appears to be an emulsion of rubber in water. Other materials such as sugar, rosin, proteins, organic acids, mineral salts, and glucosides are held in solution also in small percentages. A composition of rubber latex solution may vary within wide limits, depending upon the source of the latex, the age of the tree, the season, etc. It is general practice to add a preservative, usually ammonia or some alkaline material to prevent bacterial decomposition and coagulation. Latex is usually considered to be an ordinary negative colloid in which minute globules of a colloid, probably the rubber itself, is in a colloidal suspension in aqueous fluid. It is a negative suspensoid and behaves as such. Acids produce coagulation or precipitation and alkali increases stability of suspension. An increase in the protein content increases the stability of the latex.

In the preparation of a gypsum wallboard using latex as a bonding solution, I prefer to dilute the latex, which usually contains 33% solids, with anywhere from 3 parts to 20 parts of water, depending upon the difficulty of the bonding conditions and the amount applied. This diluted latex may be applied to the paper by sprays, brushes or the like, but I believe the preferable method to be a series of wetting rolls over which the paper passes to receive a surface application of the rubber latex solution. It is also possible to use a concentrated latex containing 60% to 70% solids, it being only necessary to dilute it in proportion to its solid rubber content.

The chemical reactions which take place during the formation of the wallboard when rubber latex is used as a bonding agent are not entirely known to me. Probably both the rosin size contained in the paper and also the plaster of Paris contained in the plastic core material, take part in the reaction. After the plastic mix is applied to the paper, the plaster of Paris rapidly takes up moisture from the rubber latex thereby serving to concentrate and possibly coagulate the latex at the interface between the core body and the paper and thus intimately lacing together the paper fibers with the crystals of gypsum formed as the result of the reaction. The fine particles of rubber are uniformly dispersed along the interface between the paper and core body, forming a layer which later coagulates under the influence of the heat in the drying kiln which is maintained at 225–500° F. It is possible that sulphur gases contained in the hot products of combustion pass through the drying kiln also serve to partially vulcanize the rubber at the interface. Regardless of the exact reaction which takes place, I have found that the rubber latex exhibits splendid adhesive qualities for bonding the paper cover sheets to the core body so that a high percentage of perfect board is produced.

I have also been able to secure bond between the cover sheets and the core body, by the addition of the latex solution to the mixing water used for the preparation of the plastic core composition. While this is not as efficient a method from the standpoint of the amount required and cost of materials, it is one which lends itself easily and quickly to machinery now commonly used in the manufacture of plasterboard. The amount required for incorporation integrally into the gypsum core also varies with the difficulty of the bonding conditions, density of the board, speed of the machine, etc. I have been able to secure bond by the integral incorporation of 3 pounds of rubber solids per thousand square feet of board ⅜ inch thick.

In the incorporation of latex integrally in the core composition, it is essential that the latex be diluted at least 50 or 100 to 1 since otherwise the material coagulates as soon as it contacts with the plaster mix and the effectiveness of its bonding qualities is thereby reduced, and it becomes an agglomerated and not a dispersed mass. It is believed that a certain amount of migration of the rubber latex takes place to the interface of the cover sheets and the core material. This migration of the latex causes the latex to be concentrated at the interface, thus producing excellent bonding results. The effectiveness of the integral method of application is dependent upon preventing the coagulation and enlargement of the colloidal particles until this migration has taken place and the most of the latex is in contact with the paper cover sheets. The heat of the drying kiln then coagulates and greatly improves the binding qualities of the rubber latex. The thin film of rubber at the interface of the core body and the paper cover sheets, greatly helps the waterproof characteristics of the plasterboard which is desirable feature when used as a plaster base.

While rubber latex is usually produced by the wild *Hevea braziliensis* trees of the Amazon region, I wish it understood that other types of rubber may be used such as that produced from the golden rod, or other natural or synthetic rubbers.

I would state in conclusion that, while the illustrated example consists a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:—

1. The method of securing bond between the core body of a plasterboard and the paper cover sheets, which comprises forming a layer of rubber latex at the interface between the paper cover sheet and the core material, permitting the core material to set to solid form, and passing the plasterboard through a drying kiln of high temperature so as to coagulate the rubber latex at said interface.

2. The method of producing a bond beween the core body of a plasterboard and a paper cover sheet, which comprises applying a rubber latex solution to the surface of the paper cover sheet, applying the cover sheet to the core composition in plastic form with the rubber latex solution at the interface between the cover sheet and the core material, permitting the plastic material to set to solid form, and drying the plasterboard at a high temperature to coagulate the rubber latex.

3. The method of producing bond between the core body and cover sheet of a plasterboard, which comprises mixing plaster of Paris with a solution containing rubber latex, applying the resulting latex composition to the cover sheet, permitting the composition to set to solid form, and drying the resulting plasterboard at a high temperature to coagulate the rubber latex at the interface between the cover sheet and the core body.

4. A plasterboard comprising a core body of cementitious material, a cover sheet adjacent said core body, and a rubber bonding agent causing the tenacious adherence of the cover sheet to said core body.

5. A plasterboard comprising a core body having gypsum as its major ingredient, a cover sheet on said core body, and a rubber bonding agent at the interface between said cover sheet and core body.

JAMES S. OFFUTT.